(12) United States Patent
Van De Ven

(10) Patent No.: US 7,722,220 B2
(45) Date of Patent: May 25, 2010

(54) LIGHTING DEVICE

(75) Inventor: Antony Paul Van De Ven, Sai Kung (HK)

(73) Assignee: Cree LED Lighting Solutions, Inc., Durham, NC (US)

( * ) Notice: Subject to any disclaimer, the term of this patent is extended or adjusted under 35 U.S.C. 154(b) by 38 days.

(21) Appl. No.: 11/743,754

(22) Filed: May 3, 2007

(65) Prior Publication Data

US 2007/0263393 A1 Nov. 15, 2007

Related U.S. Application Data

(60) Provisional application No. 60/798,446, filed on May 5, 2006.

(51) Int. Cl.
*F21V 29/00* (2006.01)
(52) U.S. Cl. .................. 362/294; 362/362; 362/800; 362/555; 362/373; 362/297; 362/296.01
(58) Field of Classification Search ................ 362/362, 362/294, 800, 373, 555, 296, 297
See application file for complete search history.

(56) References Cited

U.S. PATENT DOCUMENTS

| | | | |
|---|---|---|---|
| 3,805,937 A | 4/1974 | Hatanaka et al. |
| 3,927,290 A | 12/1975 | Denley |
| 4,325,146 A | 4/1982 | Lennington |
| 4,408,157 A | 10/1983 | Beaubien |
| 4,420,398 A | 12/1983 | Castino |
| 5,087,883 A | 2/1992 | Hoffman |
| 5,264,997 A | 11/1993 | Hutchisson et al. |
| 5,407,799 A | 4/1995 | Studier |
| 5,410,519 A | 4/1995 | Hall et al. |
| 5,563,849 A | 10/1996 | Hall et al. |

(Continued)

FOREIGN PATENT DOCUMENTS

EP 1 081 771 3/2001

(Continued)

OTHER PUBLICATIONS

U.S. Appl. No. 11/939,059, filed Nov. 13, 2007.

(Continued)

*Primary Examiner*—Sandra L O'Shea
*Assistant Examiner*—Jessica L McMillan
(74) *Attorney, Agent, or Firm*—Burr & Brown

(57) ABSTRACT

First, second and third lighting devices each comprise a thermal conduction element, solid state light emitters and a reflective element. In the second device, the conduction element defines an opening; and the emitters and reflective element are mounted on a first side of the conduction element. In the third device, the conduction element defines an opening; a first portion of a first side of the conduction element is in contact with a contact region of a construction surface; and the emitters and reflective element are mounted on the first side. A fourth device comprises a conduction element and emitters; a first portion of a first side of the conduction element is in contact with a contact region of a construction surface; the emitters are mounted on a second portion of the first side of the conduction element; and a second side of the conduction element is exposed to ambient air.

59 Claims, 7 Drawing Sheets

U.S. PATENT DOCUMENTS

| | | | |
|---|---|---|---|
| 5,803,579 | A | 9/1998 | Turnbull et al. |
| 5,820,253 | A * | 10/1998 | Scholz ........................ 362/267 |
| 5,924,785 | A | 7/1999 | Zhang et al. |
| 5,962,971 | A | 10/1999 | Chen |
| 5,998,925 | A | 12/1999 | Shimizu et al. |
| 6,066,861 | A | 5/2000 | Hohn et al. |
| 6,069,440 | A | 5/2000 | Shimizu et al. |
| 6,084,250 | A | 7/2000 | Justel et al. |
| 6,095,666 | A | 8/2000 | Salam |
| 6,132,072 | A | 10/2000 | Turnbull et al. |
| 6,163,038 | A | 12/2000 | Chen et al. |
| 6,245,259 | B1 | 6/2001 | Hohn et al. |
| 6,252,254 | B1 | 6/2001 | Soules et al. |
| 6,255,670 | B1 | 7/2001 | Srivastava et al. |
| 6,292,901 | B1 | 9/2001 | Lys et al. |
| 6,294,800 | B1 | 9/2001 | Duggal et al. |
| 6,335,538 | B1 | 1/2002 | Prutchi et al. |
| 6,348,766 | B1 | 2/2002 | Ohishi et al. |
| 6,357,889 | B1 | 3/2002 | Duggal et al. |
| 6,394,621 | B1 | 5/2002 | Hanewinkel, III |
| 6,396,081 | B1 | 5/2002 | Tews et al. |
| 6,429,583 | B1 | 8/2002 | Levinson et al. |
| 6,469,322 | B1 | 10/2002 | Srivastava et al. |
| 6,482,520 | B1 | 11/2002 | Tzeng |
| 6,501,100 | B1 | 12/2002 | Srivastava et al. |
| 6,501,102 | B2 | 12/2002 | Mueller-Mach et al. |
| 6,504,179 | B1 | 1/2003 | Ellens et al. |
| 6,504,301 | B1 | 1/2003 | Lowery |
| 6,509,651 | B1 | 1/2003 | Matsubara et al. |
| 6,513,949 | B1 | 2/2003 | Marshall et al. |
| 6,576,930 | B2 | 6/2003 | Reech et al. |
| 6,578,998 | B2 | 6/2003 | Zhang |
| 6,600,175 | B1 | 7/2003 | Baretz et al. |
| 6,608,332 | B2 | 8/2003 | Shimizu et al. |
| 6,614,103 | B1 | 9/2003 | Durocher et al. |
| 6,614,179 | B1 | 9/2003 | Shimizu et al. |
| 6,624,350 | B2 | 9/2003 | Nixon et al. |
| 6,659,632 | B2 | 12/2003 | Chen |
| 6,733,711 | B2 | 5/2004 | Durocher et al. |
| 6,740,972 | B2 | 5/2004 | Smith et al. |
| 6,746,768 | B2 | 6/2004 | Greinke et al. |
| 6,791,257 | B1 | 9/2004 | Sato et al. |
| 6,857,767 | B2 | 2/2005 | Matsui et al. |
| 6,871,982 | B2 | 3/2005 | Holman et al. |
| 6,880,954 | B2 | 4/2005 | Ollett et al. |
| 7,001,047 | B2 | 2/2006 | Holder et al. |
| 7,030,486 | B1 | 4/2006 | Marshall |
| 7,093,958 | B2 * | 8/2006 | Coushaine ................. 362/249 |
| 7,095,110 | B2 | 8/2006 | Arik et al. |
| 7,114,831 | B2 * | 10/2006 | Popovich et al. ............. 362/294 |
| 7,131,760 | B2 | 11/2006 | Mayer et al. |
| 7,144,140 | B2 | 12/2006 | Sun et al. |
| 7,178,941 | B2 * | 2/2007 | Roberge et al. ............. 362/225 |
| 7,210,832 | B2 | 5/2007 | Huang |
| 7,213,940 | B1 | 5/2007 | Van De Ven et al. |
| 7,226,189 | B2 | 6/2007 | Lee et al. |
| 7,244,058 | B2 * | 7/2007 | DiPenti et al. ............. 362/547 |
| 7,246,921 | B2 | 7/2007 | Jacobson et al. |
| 7,258,475 | B2 | 8/2007 | Kurumatani |
| 7,276,861 | B1 | 10/2007 | Shteynberg et al. |
| 7,355,284 | B2 | 4/2008 | Negley |
| 7,374,311 | B2 | 5/2008 | Rains, Jr. et al. |
| 2002/0006350 | A1 | 1/2002 | Nishida et al. |
| 2002/0087532 | A1 | 7/2002 | Barritz et al. |
| 2003/0034985 | A1 | 2/2003 | Needham Riddle et al. |
| 2003/0116312 | A1 | 6/2003 | Krassowski et al. |
| 2003/0117798 | A1 | 6/2003 | Leysath |
| 2004/0051111 | A1 | 3/2004 | Ota et al. |
| 2004/0090174 | A1 | 5/2004 | Tasch et al. |
| 2004/0090794 | A1 | 5/2004 | Ollett et al. |
| 2004/0096666 | A1 | 5/2004 | Knox et al. |
| 2004/0212998 | A1 | 10/2004 | Mohacsi |
| 2005/0001537 | A1 | 1/2005 | West et al. |
| 2005/0051789 | A1 | 3/2005 | Negley et al. |
| 2005/0058947 | A1 | 3/2005 | Rinehart et al. |
| 2005/0058948 | A1 | 3/2005 | Freese et al. |
| 2005/0058949 | A1 | 3/2005 | Wood et al. |
| 2005/0099478 | A1 | 5/2005 | Iwase |
| 2005/0135441 | A1 | 6/2005 | Ng et al. |
| 2005/0161586 | A1 | 7/2005 | Rains, Jr. et al. |
| 2005/0168689 | A1 | 8/2005 | Knox |
| 2005/0174780 | A1 | 8/2005 | Park |
| 2005/0190553 | A1 | 9/2005 | Lynch et al. |
| 2005/0225222 | A1 | 10/2005 | Mazochette et al. |
| 2005/0237739 | A1 | 10/2005 | Lee et al. |
| 2005/0274972 | A1 | 12/2005 | Roth et al. |
| 2005/0280756 | A1 | 12/2005 | Kim et al. |
| 2006/0061869 | A1 | 3/2006 | Fadel et al. |
| 2006/0081773 | A1 | 4/2006 | Rains, Jr. et al. |
| 2006/0087866 | A1 | 4/2006 | Ng et al. |
| 2006/0098438 | A1 | 5/2006 | Ouderkirk et al. |
| 2006/0098440 | A1 | 5/2006 | Allen |
| 2006/0114422 | A1 | 6/2006 | Miyazawa et al. |
| 2006/0114569 | A1 | 6/2006 | Capaldo et al. |
| 2006/0158080 | A1 | 7/2006 | Nakano et al. |
| 2006/0164729 | A1 | 7/2006 | Wood |
| 2006/0275714 | A1 | 12/2006 | Rinehart et al. |
| 2006/0285332 | A1 | 12/2006 | Goon et al. |
| 2007/0003868 | A1 | 1/2007 | Wood et al. |
| 2007/0008738 | A1 | 1/2007 | Han et al. |
| 2007/0014004 | A1 | 1/2007 | Wood |
| 2007/0047204 | A1 | 3/2007 | Parker et al. |
| 2007/0053205 | A1 | 3/2007 | Jang et al. |
| 2007/0076422 | A1 | 4/2007 | Nicolai |
| 2007/0102142 | A1 | 5/2007 | Reis et al. |
| 2007/0103875 | A1 | 5/2007 | Reis et al. |
| 2007/0127098 | A1 | 6/2007 | Wood |
| 2007/0127129 | A1 | 6/2007 | Wood et al. |
| 2007/0139895 | A1 | 6/2007 | Reis et al. |
| 2007/0188425 | A1 | 8/2007 | Saccomanno |
| 2007/0216704 | A1 | 9/2007 | Roberts et al. |
| 2007/0230183 | A1 * | 10/2007 | Shuy ........................ 362/294 |
| 2007/0242441 | A1 | 10/2007 | Aldrich et al. |
| 2008/0103714 | A1 | 5/2008 | Aldrich et al. |

FOREIGN PATENT DOCUMENTS

| | | |
|---|---|---|
| EP | 1 111 966 | 6/2001 |
| EP | 1 486 818 | 12/2004 |
| EP | 1 553 431 | 7/2005 |
| JP | 05-100106 | 4/1993 |
| WO | 98/43014 | 10/1998 |
| WO | 00/34709 | 6/2000 |
| WO | 2007/026776 | 3/2007 |

OTHER PUBLICATIONS

U.S. Appl. No. 11/613,692, filed Dec. 20, 2006.
U.S. Appl. No. 11/614,180, filed Dec. 21, 2006.
U.S. Appl. No. 11/613,714, filed Dec. 20, 2006.
U.S. Appl. No. 11/613,733, filed Dec. 20, 2006.
U.S. Appl. No. 11/624,811, filed Jan. 19, 2007.
U.S. Appl. No. 11/626,483, filed Jan. 24, 2007.
U.S. Appl. No. 11/751,982, filed May 22, 2007.
U.S. Appl. No. 11/753,103, filed May 24, 2007.
U.S. Appl. No. 11/751,990, filed May 22, 2007.
U.S. Appl. No. 11/685,761, filed Mar. 13, 2007.
U.S. Appl. No. 11/736,799, filed Apr. 18, 2007.
U.S. Appl. No. 11/737,321, filed Apr. 19, 2007.
U.S. Appl. No. 11/755,153, filed May 30, 2007.
U.S. Appl. No. 11/755,162, filed May 30, 2007.
U.S. Appl. No. 11/856,421, filed Sep. 17, 2007.
U.S. Appl. No. 11/854,744, filed Sep. 13, 2007.
U.S. Appl. No. 11/859,048, filed Sep. 21, 2007.
U.S. Appl. No. 11/939,047, filed Nov. 13, 2007.

U.S. Appl. No. 11/936,163, filed Nov. 7, 2007.
U.S. Appl. No. 11/843,243, filed Aug. 22, 2007.
U.S. Appl. No. 11/948,021, filed Nov. 30, 2007.
U.S. Appl. No. 11/870,679, filed Oct. 11, 2007.
U.S. Appl. No. 11/951,626, filed Dec. 6, 2007.
U.S. Appl. No. 12/035,604, filed Feb. 22, 2008.
U.S. Appl. No. 11/859,048 filed Sep. 21, 2007.
U.S. Appl. No. 11/939,052, filed Nov. 13, 2007.
U.S. Appl. No. 11/736,799, filed Apr. 18, 2007.
U.S. Appl. No. 11/673,951, filed Feb. 12, 2007.
U.S. Appl. No. 11/408,767, filed Apr. 21, 2006.
U.S. Appl. No. 11/408,648, filed Apr. 21, 2006.
U.S. Appl. No. 11/548,357, filed Oct. 11, 2006.
U.S. Appl. No. 12/146,018, filed Jun. 27, 2008.

Narendran et al., "Solid State lighting: failure analysis of white LEDs," Journal of Cystal Growth, vol. 268, Issues 1-4, Aug. 2004, Abstract.
Cree, Inc., "Cree® Xlamp® 7090 XR-E Series LED Binning and Labeling," Application Note: CLD-AP08.000, 7pp (2006).
Cree, Inc., "Cree® Xlamp® 7090 XR-E Series LED Data Sheet," Datasheet: CLD-DS05.000, 10 pp (2006).
Cree, Inc., "Cree® Xlamp® 7090 XR-E Series LED Secondary Optics," Datasheet: CLD-DS07.000, 3 pp (2004-2006).
McMaster-Carr Supply Company, "Multipurpose Aluminum (Alloy 6061), specification sheets," Retrieved Dec. 14, 2006 from www.mcmaster.com/param/asp/Psearch2.asp?regTyp=parametric&act=psearch%F.., 3 pp.
Cree LED Light, LR6, 6 Downlight Module, Product Description, 2 pp.

* cited by examiner

US 7,722,220 B2

LIGHTING DEVICE

CROSS-REFERENCE TO RELATED APPLICATION

This application claims the benefit of U.S. Provisional Patent Application No. 60/798,446, filed May 5, 2006, the entirety of which is incorporated herein by reference.

FIELD OF THE INVENTION

The present invention relates to a lighting device, in particular, a device which includes one or more solid state light emitters. In a specific aspect, the present invention relates to a "recessed can" lighting device.

BACKGROUND OF THE INVENTION

A large proportion (some estimates are as high as twenty-five percent) of the electricity generated in the United States each year goes to lighting. Accordingly, there is an ongoing need to provide lighting which is more energy-efficient. It is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient as compared to solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000. Fluorescent bulbs have longer lifetimes (e.g., 10,000-20,000 hours) than incandescent lights, but provide less favorable color reproduction.

Color reproduction is typically measured using the Color Rendering Index (CRI Ra) which is a relative measure of the shift in surface color of an object when lit by a particular lamp. CRI Ra is a modified average of the measurements of how the color rendition of an illumination system compares to that of a reference radiator when illuminating eight reference colors. The CRI Ra equals 100 if the color coordinates of a set of test colors being illuminated by the illumination system are the same as the coordinates of the same test colors being irradiated by the reference radiator. Daylight has a high CRI (Ra of approximately 100), with incandescent bulbs also being relatively close (Ra greater than 95), and fluorescent lighting being less accurate (typical Ra of 70-80). Certain types of specialized lighting have very low CRI Ra (e.g., mercury vapor or sodium lamps have Ra as low as about 40 or even lower).

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Designs have been provided in which existing LED component packages and other electronics are assembled into a fixture. In such designs, a packaged LED is mounted to a circuit board or directly to a heat sink, the circuit board is mounted to a heat sink, and the heat sink is mounted to the fixture housing along with required drive electronics. In many cases, additional optics (secondary to the package parts) are also necessary.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

In substituting light emitting diodes for other light sources, e.g., incandescent light bulbs, packaged LEDs have been used with conventional light fixtures, for example, fixtures which include a hollow lens and a base plate attached to the lens, the base plate having a conventional socket housing with one or more contacts which is electrically coupled to a power source. For example, LED light bulbs have been constructed which comprise an electrical circuit board, a plurality of packaged LEDs mounted to the circuit board, and a connection post attached to the circuit board and adapted to be connected to the socket housing of the light fixture, whereby the plurality of LEDs can be illuminated by the power source.

Although the development of light emitting diodes has in many ways revolutionized the lighting industry, some of the characteristics of light emitting diodes have presented challenges, some of which have not yet been fully met. For example, the emission spectrum of any particular light emitting diode is typically concentrated around a single wavelength (as dictated by the light emitting diode's composition and structure), which is desirable for some applications, but not desirable for others, (e.g., for providing lighting, such an emission spectrum provides a very low CRI Ra).

Traditional recessed light fixtures comprise a metal cylinder ("can") mounted into the ceiling using horizontal metal struts attached to the ceiling joints. Within the cylinder, mounted on an adjustable sliding plate, is light bulb socket into which a light bulb is inserted. Typically a 60 W incandescent light bulb or a 15 W compact fluorescent bulb is used. For example, a conventional recessed light fixture is depicted in FIG. 1.

Around the annulus of the bulb and extending downward to the lower inside edge of the cylinder is a baffle or reflecting cone. A cosmetic ring is placed around the bottom edge of the cylinder and extending outward to cover the area immediately surrounding the circular cutout in the ceiling and create an attractive edging around the light output aperture.

The position (height) of the bulb can be set such that the bulb is not directly visible to the people standing in the room and the light from the fixture is directed so that it principally illuminates an area below the fixture.

These fixtures are popular because they do not create significant glare (being recessed) and highlight objects situated below them.

The "cans" are generally required to be substantially airtight around the sides and top to prevent the loss of ambient heat or cooling from the room into the ceiling cavity through the fixture. As the lamp is mounted in the can, much of the heat generated by the light source is trapped within the can, because the air heated in the can rises and is trapped within the can. Special insulation is usually required around the can within the ceiling cavity to prevent fire.

The environment inside the can is not ideal for solid-state lighting. LEDs, for example, have significant energy and lifetime benefits over incandescent and fluorescent light sources—LEDs, however, do not operate well in high temperatures. LED light sources have operating lifetimes of decades as opposed to just months or 1-2 years for the others mentioned. An LED's lifetime is significantly shortened, however, if it operates at elevated temperatures. It is generally accepted that the junction temperature of an LED should not exceed 70 degrees C. if a lifetime of 100,000 hours is desired.

Efficient individual LED light sources typically provide between 3 and 50 lumens of light per source (LED die or lamp) depending on the size of the LED die. A typical recessed downlight using a 60 W incandescent bulb provides about 500 lumens of light, so it can be seen that to provide a similar amount of light from LEDs, multiple LED light sources would be required.

To provide a similar amount of light using "small die" (typically 300 square micrometers), approximately 200 die would be required, or, alternatively using large "power" die (typically approximately 1 square millimeter) 10-20 die would be required.

For the above and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, efficacy (lm/W), cost and/or duration of service.

BRIEF SUMMARY OF THE INVENTION

In a first aspect of the present invention, there is provided a lighting device comprising at least one thermal conduction element, a plurality of solid state light emitters and at least one reflective element, in which the solid state light emitters and the reflective element are mounted on the thermal conduction element.

In some embodiments according to the first aspect of the present invention, the thermal conduction element defines at least one conduction element opening. In some of such embodiments, the thermal conduction element surrounds the conduction element opening.

In some embodiments according to the first aspect of the present invention, the reflective element is mounted on a second portion of the thermal conduction element.

In some embodiments according to the first aspect of the present invention, a second reflective element is positioned on the thermal conduction element.

In some embodiments according to the first aspect of the present invention, a third portion of the thermal conduction element is in contact with a contact region of a construction surface, the construction surface having at least one construction surface opening, the contact region surrounding the construction surface opening In some embodiments according to the first aspect of the present invention, a fourth portion of the thermal conduction element is exposed to ambient air.

In a second aspect of the present invention, there is provided a lighting device comprising at least one thermal conduction element, a plurality of solid state light emitters and at least one reflective element, in which the thermal conduction element defines at least one conduction element opening, and in which the solid state light emitters and the reflective element are mounted on a first side of the thermal conduction element.

In a third aspect of the present invention, there is provided a lighting device comprising at least one thermal conduction element, a plurality of solid state light emitters and at least one reflective element, in which the thermal conduction element defines at least one conduction element opening, in which a first portion of a first side of the thermal conduction element is in contact with a contact region of a construction surface, the contact region surrounding an opening into which the reflective element extends, and in which the solid state light emitters and the reflective element are mounted on the first side of the thermal conduction element.

In a fourth aspect of the present invention, there is provided a lighting device comprising at least one thermal conduction element and a plurality of solid state light emitters, in which a first portion of a first side of the thermal conduction element is in contact with a contact region of a construction surface, in which the solid state light emitters are mounted on a second portion of the first side of the thermal conduction element, and in which a second side of the thermal conduction element is exposed to ambient air.

In some embodiments according to the present invention, the lighting device further comprises a light transmitting plate which covers the conduction element opening, so that light which is emitted by any of the solid state light emitters and which passes through the conduction element opening must pass through the light transmitting plate.

In some embodiments according to the present invention, the first side of the thermal conduction element is a first surface and a second side of the thermal conduction element is a second surface, and the first surface and the second surface are substantially parallel to each other and are spaced from each other by a distance which not greater than 10% of the maximum distance between any two points on the second surface.

In some embodiments according to the present invention, the lighting device further comprises at least one shield member, which extends from the first side of the thermal conduction element away from the second side of the thermal conduction element.

In one preferred aspect of the present invention, there is provided a light fixture which employs solid state light emitters (e.g., LEDs) and which can be mounted in a room (e.g., in a ceiling), where heat from the solid state light emitters is effectively transferred to the room environment, direct view of the solid state light emitters is obscured (to reduce glare), and/or collimation and/or mixing and/or filtering of the light is provided before and/or as it is exiting the fixture into the room.

In another preferred aspect of the present invention, there is provided a light fixture using solid state light emitters (e.g., LEDs) that is aesthetically attractive and which can be recessed into a ceiling (or other construction surface, e.g., a wall or a floor). In particular embodiments according to the present invention, such lighting fixtures can have favorably reduced glare, can have a "warm" color temperature, can have a high CRI Ra, can have a very long life, can present reduced fire hazard (or negligible fire hazard), can be energy efficient and/or can be easy to install.

The invention may be more fully understood with reference to the accompanying drawings and the following detailed description of the invention.

BRIEF DESCRIPTION OF THE DRAWING FIGURES

DETAILED DESCRIPTION OF THE INVENTION

As noted above, in first, second and third aspects of the present invention, there are provided lighting devices, each comprising at least one thermal conduction element, a plurality of solid state light emitters and at least one reflective element. In a fourth aspect of the present invention, there is provided a lighting device comprising at least one thermal conduction element and a plurality of solid state light emitters.

The at least one thermal conduction element can be made of any material which provides good heat conduction, as well as other properties needed to function properly in the environment in which it is deployed and in view of its design, e.g., structural rigidity, resistance to abrasion and corrosion, etc. A representative example of a suitable material out of which the thermal conduction element(s) can be constructed is aluminum.

In some embodiments according to the present invention, the thermal conduction element defines at least one conduction element opening. In some of such embodiments, the thermal conduction element surrounds the conduction element opening.

For example, FIGS. 2, 4 and 9-12 (described in detail below) each depict lighting devices which include a thermal conduction element which defines and surrounds a conduction element opening.

In some embodiments according to the present invention, e.g., the lighting device depicted in FIG. 13 (described in detail below), the thermal conduction element defines at least one conduction element opening but does not surround the conduction element opening.

Figure 1:
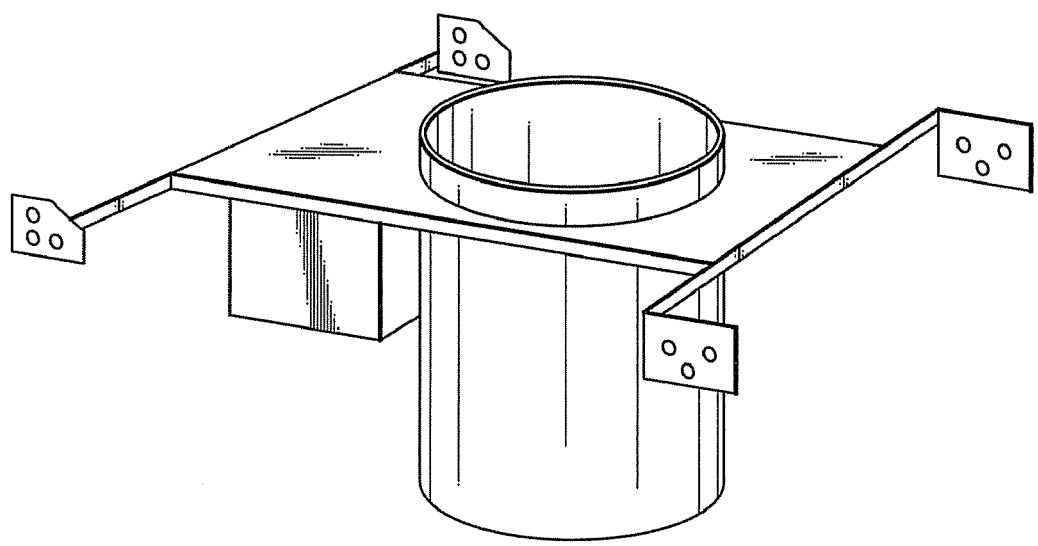
FIG. 1 is a perspective view of a conventional recessed light fixture.
Figure 2:
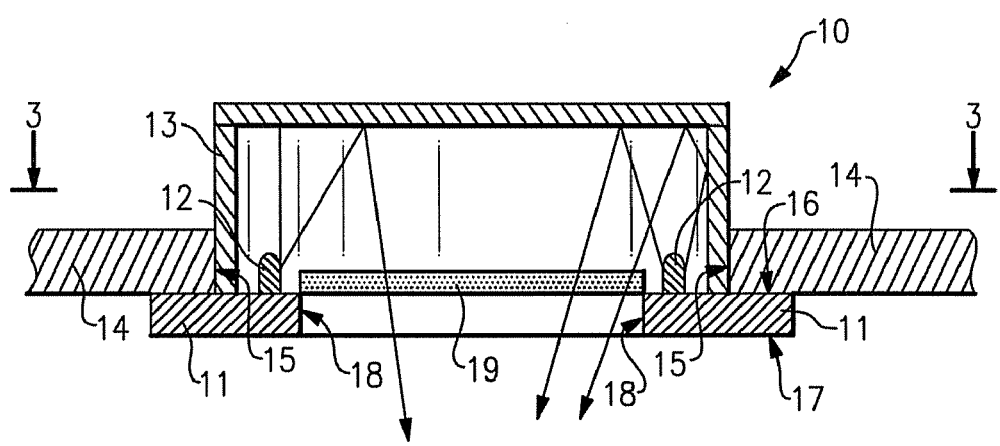
FIG. 2 is a sectional view of a representative embodiment of a lighting device according to the present invention.
Figure 4:
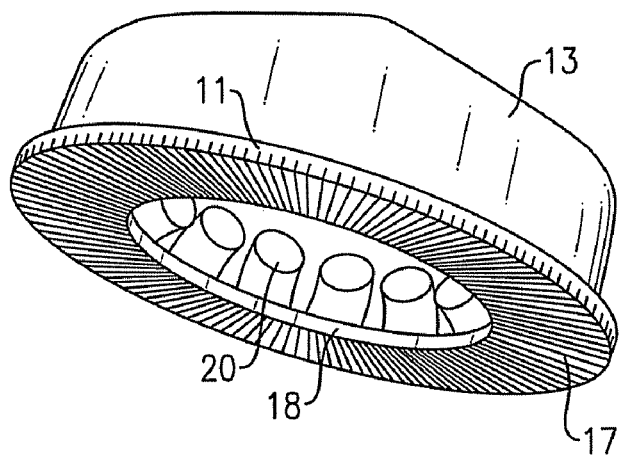
FIG. 4 is a bottom perspective view of an embodiment of a lighting device according to the present invention.
Figure 9:
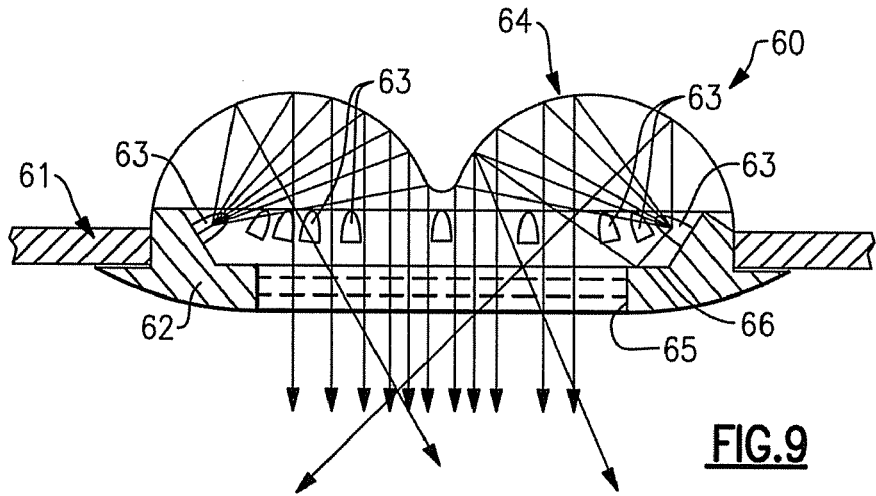
FIG. 9 is a sectional view of another representative embodiment of a lighting device according to the present invention.

In some embodiments according to the present invention, e.g., the lighting devices depicted in FIGS. 2, 4 and 9, the thermal conduction element is substantially toroidal. The expression "toroidal" is used herein consistently with its conventional usage to refer to a shape which could be generated by rotating a planar closed curve about a line that lies in the same plane as the curve but does not intersect the curve. That is, the expression "toroidal" encompasses doughnut shapes which would be generated by rotating circles about a line that lies in the same plane as the circle, as well as shapes which would be generated by rotating squares, triangles, irregular (abstract) shapes, etc. about a line that lies in the same plane. The expression "substantially toroidal" (which encompasses "toroidal") means that the y coordinate for each point on the structure is within 0.95 to 1.05 times the value obtained by inserting the x coordinate of such point into a formula for a toroid.

As used herein, the term "substantially," e.g., in the expressions "substantially airtight", "substantially parallel", "substantially annular", "substantially transparent", "substantially conical", "substantially frustoconical", "substantially cylindrical", "substantially semi-elliptical", "substantially concentric," etc., means at least about 95% correspondence with the feature recited, e.g., the expression "substantially airtight" means that the structure which is substantially airtight is permeated by not more than 5% of the amount of air which would permeate an opening;

the expression "substantially parallel" means that two lines (or two planes) diverge from each other at most by an angle of 5% of 90 degrees, i.e., 4.5 degrees;

the expression "substantially annular" means that the y coordinate for each point on the structure is within 0.95 to 1.05 times the value obtained by inserting the x coordinate of such point into a formula for an annulus;

the expression "substantially conical" means that the y coordinate for each point on the structure is within 0.95 to 1.05 times the value obtained by inserting the x coordinate of such point into a formula for a cone;

the expression "substantially frustoconical" means that the y coordinate for each point on the structure is within 0.95 to 1.05 times the value obtained by inserting the x coordinate of such point into a formula for a frustocone;

the expression "substantially cylindrical" means that the y coordinate for each point on the structure is within 0.95 to 1.05 times the value obtained by inserting the x coordinate of such point into a formula for a cylinder;

the expression "substantially concentric" means that means that: the y coordinate for each point on a first substantially circular locus of points is within 0.95 to 1.05 times the value obtained by inserting the x coordinate of such point into a formula for a first circle, the y coordinate for each point on a second substantially circular locus of points is within 0.95 to 1.05 times the value obtained by inserting the x coordinate of such point into a formula for a first circle, and the distance between the center of the first circle and the center of the second circle is not more than 5% of the radius of one of the circles;

the expression "substantially semi-elliptical" means that a semi-ellipse can be drawn having the formula $x^2/a^2+y^2/b^2=1$, where $y \geq 0$, and imaginary axes can be drawn at a location where the y coordinate of each point on the structure is within 0.95 to 1.05 times the value obtained by inserting the x coordinate of such point into such formula; and the expression "substantially transparent" means that at least 95% of light entering the structure passes through and exits the structure on an opposite side.

In some embodiments according to the present invention, the thermal conduction element defines at least one conduction element opening. For instance, where the thermal conduction element is substantially toroidal, the toroid defines a conduction element opening.

In some embodiments according to the present invention, the thermal conduction element is substantially annular.

In some embodiments according to the present invention, the heat conduction element has a second side from which heat is dissipated. In some such embodiments, the second side of the heat conduction element has a series of fins (alternately termed recessed slots) to increase the surface area of the second side, in order to provide improved heat dissipation. In some embodiments, as an alternative to, or in addition to fins, the second side may be coated, treated, textured, or patterned to further increase its surface area and/or reduce its thermal resistance and also provide a pleasing appearance.

In general, any desired solid state light emitter or emitters can be employed in accordance with the present invention. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made).

In some embodiments according to the present invention, at least one of the solid state light emitters is an LED.

Light emitting diodes are well-known semiconductor devices that convert electrical current into light. A wide variety of light emitting diodes are used in increasingly diverse fields for an ever-expanding range of purposes.

More specifically, light emitting diodes are semiconducting devices that emit light (ultraviolet, visible, or infrared) when a potential difference is applied across a p-n junction structure. There are a number of well-known ways to make light emitting diodes and many associated structures, and the present invention can employ any such devices. By way of example, Chapters 12-14 of Sze, Physics of Semiconductor Devices, (2d Ed. 1981) and Chapter 7 of Sze, Modern Semiconductor Device Physics (1998) describe a variety of photonic devices, including light emitting diodes.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

As is well-known, a light emitting diode produces light by exciting electrons across the band gap between a conduction band and a valence band of a semiconductor active (light-emitting) layer. The electron transition generates light at a wavelength that depends on the band gap. Thus, the color of the light (wavelength) emitted by a light emitting diode depends on the semiconductor materials of the active layers of the light emitting diode.

Any light emitting diode or diodes employed can be selected from among any light emitting diodes. Wide varieties of light emitting diodes are readily obtainable and well known to those skilled in the art, and therefore it is not necessary to describe in detail such devices, and/or the materials out of which such devices are made.

Representative examples of suitable LEDs are described in:

(1) U.S. Patent Application No. 60/753,138, filed on Dec. 22, 2005, entitled "Lighting Device" (inventor: Gerald H. Negley), the entirety of which is hereby incorporated by reference;

(2) U.S. Patent Application No. 60/794,379, filed on Apr. 24, 2006, entitled "Shifting Spectral Content in LEDs by Spatially Separating Lumiphor Films" (inventors: Gerald H. Negley and Antony Paul van de Ven), the entirety of which is hereby incorporated by reference;

(3) U.S. Patent Application No. 60/808,702, filed on May 26, 2006, entitled "Lighting Device" (inventors: Gerald H. Negley and Antony Paul van de Ven), the entirety of which is hereby incorporated by reference;

(4) U.S. Patent Application No. 60/808,925, filed on May 26, 2006, entitled "Solid State Light Emitting Device and Method of Making Same" (inventors: Gerald H. Negley and Neal Hunter), the entirety of which is hereby incorporated by reference;

(5) U.S. Patent Application No. 60/802,697, filed on May 23, 2006, entitled "Lighting Device and Method of Making" (inventor: Gerald H. Negley), the entirety of which is hereby incorporated by reference;

(6) U.S. Patent Application No. 60/839,453, filed on Aug. 23, 2006, entitled "LIGHTING DEVICE AND LIGHTING METHOD" (inventors: Antony Paul van de Ven and Gerald H. Negley), the entirety of which is hereby incorporated by reference;

(7) U.S. Patent Application No. 60/857,305, filed on Nov. 7, 2006, entitled "LIGHTING DEVICE AND LIGHTING METHOD" (inventors: Antony Paul van de Ven and Gerald H. Negle), the entirety of which is hereby incorporated by reference;

(8) U.S. Patent Application No. 60/851,230, filed on Oct. 12, 2006, entitled "LIGHTING DEVICE AND METHOD OF MAKING SAME" (inventor: Gerald H. Negley, the entirety of which is hereby incorporated by reference.

Because light that is perceived as white is necessarily a blend of light of two or more colors (or wavelengths), no single light emitting diode junction has been developed that can produce white light. "White" LED lamps have been produced which have a light emitting diode pixel formed of respective red, green and blue light emitting diodes. Another "white" LED which has been produced includes (1) a light emitting diode which generates blue light and (2) a luminescent material (e.g., a phosphor) that emits yellow light in response to excitation by light emitted by the light emitting diode, whereby the blue light and the yellow light, when mixed, produce light that is perceived as white light.

In addition, the blending of primary colors to produce combinations of non-primary colors is generally well understood in this and other arts. In general, the 1931 CIE Chromaticity Diagram (an international standard for primary colors established in 1931), and the 1976 CIE Chromaticity Diagram (similar to the 1931 Diagram but modified such that similar distances on the Diagram represent similar perceived differences in color) provide useful reference for defining colors as weighted sums of primary colors.

The CRI Ra of efficient white LED lamps is generally low (in the range 65-75) as compared to incandescent light sources (Ra of about 100). Additionally the color temperature for LEDs is generally "cooler" (~5500K) and less desirable then the color temperature of incandescent or CCFL bulbs (~2800K). Both these deficiencies in LEDs can be improved by the addition of other LEDs or lumiphors of selected saturated colors. As indicated above, light sources according to the present invention can utilize specific color "blending" of light sources of specific (x,y) color chromaticity coordinates (see U.S. Patent Application No. 60/752,555, filed Dec. 21, 2005, entitled "Lighting Device and Lighting Method" (inventors: Antony Paul Van de Ven and Gerald H. Negley), the entirety of which is hereby incorporated by reference). For example, light from additional selected saturated sources can be mixed with the broad spectrum source(s) to provide uniform illumination without any areas of discoloration; and if desired, for cosmetic reasons, the individual light emitters can be made to be not visible as discreet devices or discreet color areas when the illumination source or aperture is viewed directly.

Light emitting diodes can thus be used individually or in any combinations, optionally together with one or more luminescent material (e.g., phosphors or scintillators) and/or filters, to generate light of any desired perceived color (including white). Accordingly, the areas in which efforts are being made to replace existing light sources with light emitting diode light sources, e.g., to improve energy efficiency, CRI Ra, efficacy (lm/W), and/or duration of service, are not limited to any particular color or color blends of light.

A wide variety of luminescent materials (also known as lumiphors or luminophoric media, e.g., as disclosed in U.S. Pat. No. 6,600,175, the entirety of which is hereby incorporated by reference) are well-known and available to persons of skill in the art. For example, a phosphor is a luminescent material that emits a responsive radiation (e.g., visible light) when excited by a source of exciting radiation. In many instances, the responsive radiation has a wavelength which is different from the wavelength of the exciting radiation. Other examples of luminescent materials include scintillators, day glow tapes and inks which glow in the visible spectrum upon illumination with ultraviolet light.

Luminescent materials can be categorized as being down-converting, i.e., a material which converts photons to a lower energy level (longer wavelength) or up-converting, i.e., a material which converts photons to a higher energy level (shorter wavelength).

Luminescent material (or materials), if employed, can be any desired luminescent material. As noted above, persons skilled in the art are familiar with, and have ready access to, a wide variety of luminescent materials. The one or more luminescent materials can be down-converting or up-converting, or can include a combination of both types.

For example, the one or more luminescent materials can be selected from among phosphors, scintillators, day glow tapes, inks which glow in the visible spectrum upon illumination with ultraviolet light, etc.

The expression "lumiphor", as used herein, refers to any luminescent element, i.e., any element which includes a luminescent material, a variety of which are readily available and well-known to those skilled in the art.

Inclusion of luminescent materials in LED devices has been accomplished by adding the luminescent materials to a clear or transparent encapsulant material (e.g., epoxy-based, silicone-based, glass-based material, metal oxide-based, etc) as discussed above, for example by a blending or coating process.

For example, U.S. Pat. No. 6,963,166 (Yano '166) discloses that a conventional light emitting diode lamp includes a light emitting diode chip, a bullet-shaped transparent housing to cover the light emitting diode chip, leads to supply current to the light emitting diode chip, and a cup reflector for reflecting the emission of the light emitting diode chip in a uniform direction, in which the light emitting diode chip is encapsulated with a first resin portion, which is further encapsulated with a second resin portion. According to Yano '166, the first resin portion is obtained by filling the cup reflector with a resin material and curing it after the light emitting diode chip has been mounted onto the bottom of the cup reflector and then has had its cathode and anode electrodes electrically connected to the leads by way of wires. According to Yano '166, a phosphor is dispersed in the first resin portion so as to be excited with the light A that has been emitted from the light emitting diode chip, the excited phosphor produces fluorescence ("light B") that has a longer wavelength than the light A, a portion of the light A is transmitted through the first resin portion including the phosphor, and as a result, light C, as a mixture of the light A and light B, is used as illumination.

As noted above, "white LED lamps" (i.e., lamps which are perceived as being white or near-white) have been investigated as potential replacements for white incandescent lamps. A representative example of a white LED lamp includes a package of a blue light emitting diode chip, made of indium gallium nitride (InGaN) or gallium nitride (GaN), coated with a phosphor such as YAG. In such an LED lamp, the blue light emitting diode chip produces an emission with a wavelength of about 450 nm, and the phosphor produces yellow fluorescence with a peak wavelength of about 550 nm on receiving that emission. For instance, in some designs, white light emitting diode lamps are fabricated by forming a ceramic phosphor layer on the output surface of a blue light-emitting semiconductor light emitting diode. Part of the blue ray emitted from the light emitting diode chip passes through the phosphor, while part of the blue ray emitted from the light emitting diode chip is absorbed by the phosphor, which becomes excited and emits a yellow ray. The part of the blue light emitted by the light emitting diode which is transmitted through the phosphor is mixed with the yellow light emitted by the phosphor. The viewer perceives the mixture of blue and yellow light as white light.

As also noted above, in another type of LED lamp, a light emitting diode chip that emits an ultraviolet ray is combined with phosphor materials that produce red (R), green (G) and blue (B) light rays. In such an LED lamp, the ultraviolet ray that has been radiated from the light emitting diode chip excites the phosphor, causing the phosphor to emit red, green and blue light rays which, when mixed, are perceived by the human eye as white light. Consequently, white light can also be obtained as a mixture of these light rays.

Accordingly, one or more lumiphors can be employed, and can individually be any lumiphor, a wide variety of which, as noted above, are known to those skilled in the art. For example, any such lumiphor can comprise (or can consist essentially of, or can consist of) one or more phosphor, and can, if desired, further comprise (or consist essentially of, or consist of) one or more highly transmissive (e.g., transparent or substantially transparent, or somewhat diffuse) binder, e.g., made of epoxy, silicone, glass, metal oxide or any other suitable material (for example, in any given lumiphor comprising one or more binder, one or more phosphor can be dispersed within the one or more binder). For example, the thicker the lumiphor, in general, the lower the weight percentage of the phosphor can be. Representative examples of the weight percentage of phosphor include from about 3.3 weight percent to about 4.7 weight percent, although, as indicated above, depending on the overall thickness of the lumiphor, the weight percentage of the phosphor could be generally any value, e.g., from 0.1 weight percent to 100 weight percent (e.g., a lumiphor formed by subjecting pure phosphor to a hot isostatic pressing procedure). Any such lumiphors, if employed, can further comprise any of a number of well-known additives, e.g., diffusers, scatterers, tints, etc.

Any lumiphors employed can be selected from among any lumiphors. Wide varieties of lumiphors are readily obtainable and well known to those skilled in the art, and therefore it is not necessary to describe in detail such devices, and/or the materials out of which such devices are made.

Representative examples of lumiphors which are suitable for use in the devices according to the present invention include those described in the patent applications referred to above as disclosing light emitting diodes which are suitable for use in the devices according to the present invention, as well as in U.S. Patent Application No. 60/839,453, filed on Aug. 23, 2006, entitled "LIGHTING DEVICE AND LIGHTING METHOD" (inventors: Antony Paul van de Ven and Gerald H. Negley), the entirety of which is hereby incorporated by reference.

As indicated above, the lighting devices according to the present invention can comprise any desired number of solid state emitters. For example, a lighting device according to the present invention can include 50 or more light emitting diodes, or can include 100 or more light emitting diodes, etc. In general, with current light emitting diodes, greater efficiency can be achieved by using a greater number of smaller light emitting diodes (e.g., 100 light emitting diodes each having a surface area of 0.1 mm$^2$ vs. 25 light emitting diodes each having a surface area of 0.4 mm$^2$ but otherwise being identical).

Analogously, light emitting diodes which operate at lower current densities are generally more efficient. Light emitting diodes which draw any particular current can be used according to the present invention. In one aspect of the present invention, light emitting diodes which each draw not more than 50 milliamps are employed.

By having multiple solid state light emitters (as opposed to a single point source of light), the light source is affected less by shadowing—that is, if an object which is smaller than the light emitting area is placed in front of the light emitting area, only a portion of the light rays would be blocked. Since the light sources follow the Huygens principle (each source acts as a spherical wave front), the viewing of a shadow is not seen, and only a slight dimming of the illuminated source is seen (in contrast to where a single filament is employed, where the light would be substantially dimmed and a shadow would be observed).

The solid state light emitters can emit light of any desired wavelength or wavelengths (or wavelength range or wavelength ranges) within the ranges of infrared, visible and ultraviolet light, including, e.g., (1) two or more light emitting diodes emitting light within different wavelength ranges within the visible spectrum, (2) two or more light emitting diodes emitting light within different wavelength ranges within the infrared spectrum, (3) two or more light emitting diodes emitting light within different wavelength ranges within the ultraviolet spectrum, (4) one or more light emitting diodes emitting light within the visible spectrum and one or more light emitting diodes emitting light within the infrared spectrum, (5) one or more light emitting diodes emitting light within the visible spectrum and one or more light emitting diodes emitting light within the ultraviolet spectrum, etc.

The reflective element can be made of any suitable reflective material. Persons of skill in the art are familiar with, and can readily obtain, a wide variety of such materials. A representative example of a suitable material out of which the reflective element can be made is a material marketed by Furukawa (a Japanese corporation) under the trademark MCPET®.

The reflective element can be any desired shape. Representative examples of shapes for the reflective element include hollow conical (or substantially conical), hollow frustoconical (or substantially frustoconical), hollow cylindrical (or substantially cylindrical) and hollow semi-elliptical (or substantially semi-elliptical), or any shape which includes one or more portions which are individually selected from among hollow conical (or substantially conical), hollow frustoconical (or substantially frustoconical), hollow cylindrical (or substantially cylindrical) and hollow semi-elliptical (or substantially semi-elliptical). Optionally, the reflective element can comprise numerous concave surfaces, and one or more light emitting diodes can be mounted on any or all of such concave surfaces.

In some embodiments, the reflector comprises a highly reflective flat surface (>90%) such that the light incident on the reflector is reflected and directed towards the aperture. In other embodiments, the reflector comprises a curved surface(s).

In other embodiments, more particularly related to a ring or round fixture, the reflector comprises a cone or series of facets such that the light from individual emitters is directed to similar point within the plane of the aperture.

In the second and third aspects according to the present invention, and in some embodiments according to the fourth aspect of the present invention, the solid state light emitters and the reflective element are mounted on a first side of the thermal conduction element.

In some embodiments according to the present invention, the first portion (i.e., the portion on which the reflective surface is mounted) of the first side of the thermal conduction element, and the second portion (i.e., the portion on which the solid state light emitters are mounted) of the first side of the thermal conduction element are substantially concentric, with the first portion being radially outside the second portion.

In some embodiments according to the present invention, the second portion (i.e., the portion on which the solid state light emitters are mounted) of the first side of the thermal conduction element surrounds the conduction element opening.

The lighting devices of the present invention can be installed in a construction surface, e.g., in a ceiling, a wall or a floor. According to one method for installing the lighting device, a construction surface opening is formed in the construction surface, and the lighting device is positioned such that the contact region of the thermal conduction element (i.e., the first portion of the first side of the thermal conduction element) surrounds the construction surface opening (for example, the first portion of the first side can be in contact with the construction surface at least at locations adjacent to the construction surface opening), and then the lighting device is attached to the construction surface in any suitable manner (persons skilled in the art are familiar with a wide variety of ways of attaching a lighting device, such as the lighting devices according to the present invention, to different construction surfaces).

The expression "in contact with", as used in the present specification (including in the preceding paragraph), means that the first structure which is "in contact with" a second structure can be in direct contact with the second structure, or can be separated from the second structure by one or more intervening structures (i.e., in indirect contact), where the first and second structures, and the one or more intervening structures each have at least one surface which is in direct contact with another surface selected from among surfaces of the first and second structures and surfaces of the one or more intervening structures.

In some embodiments according to the present invention, other light emitters (i.e., other than solid state light emitters) can be included. For example, a lighting device according to the present invention which includes a plurality of solid state light emitters can further include one or more incandescent light emitters and/or one or more fluorescent light emitters. In such embodiments, the light from the respective different light emitters can be mixed together, if desired.

As noted above, an optional light transmitting plate can be included, if desired. In some embodiments according to the present invention, the light from the individual light emitters can be mixed either by using a reflector with a slight diffuse reflectance and directing the light from multiple emitters to the same point on the reflector, or, alternatively, where the light is directed to a common point within the aperture, the light transmitting plate that is covering the aperture can have a mixing or diffusing function.

Such a light transmitting plate can comprise a transparent material such as glass, plastic, a crystal material or a composite material, and may include a textured surface or surfaces, such textured surfaces being formed by etching, abrasion, imprinting, impression, coating or casting and may in certain embodiments include features such as holographic type features or micro lenses or lenticular type lens arrangements so that in addition to mixing the light, the light is directed to form a desired projection angle.

The light transmitting plate, if included, may, if desired, contain diffusing materials, lumiphors, colorants, scattering particles, nano-particles and regions of different refractive index.

Alternatively or additionally, the surface(s) of a light transmitting plate, if included, may be treated with an anti-reflection surface material or the like to maximize the amount of light transmitted through the plate.

As noted above, some embodiments of the lighting devices according to the present invention can, if desired, also include a shield member which extends from the first side of the thermal conduction element away from the second side of the thermal conduction element, in order to obstruct the solid state light emitters from view. Such a shield member, if provided, can be formed of any suitable material, e.g., any of the materials which are suitable for forming the reflective element.

In some embodiments according to the present invention, one or more lenses and/or one or more reflectors can be mounted on the thermal conduction element adjacent to the solid state light emitters to colimate the light of the light emitters prior to its reflection by the reflective element.

Persons of skill in the art are familiar with various ways of attaching solid state light emitters to various structures, and any such ways can be employed to attach the solid state light emitters to the thermal conduction element in accordance with the present invention.

For example, LEDs can be mounted on the first side of the thermal conduction element and can be thermally connected to the thermal conduction element, whereby heat generated by the LEDs is conducted through the body of the thermal conduction element and dissipated on the second side of the thermal conduction element.

In some embodiments of the present invention, the solid state light emitters are positioned such that the light emitted is substantially directed within an angle of +/−70 of an axis perpendicular to the plane of the first side (and/or the conductive element opening).

In some embodiments of the present invention, light from the emitters is projected onto the reflective element such that a significant portion of the light is reflected towards and through the conductive element opening.

Persons of skill in the art are familiar with various ways of attaching luminescent elements to various structures, and any such ways can be employed in accordance with the present invention.

In some embodiments according to the present invention, one or more of the solid state light emitters is attached to the thermal conduction element by thermally sinking the light emitters (e.g., chips), e.g., using conductive tape, epoxy or any other suitable interlayer which facilitates thermal flow, as well-known to those skilled in the art.

The heat load produced by the solid state light emitters is distributed over the surface and through the depth of the thermal conduction element. The more uniformly the solid state light emitters are distributed over the surface area of the thermal conduction element, the more uniformly the heat load is distributed. As a result, the thermal conduction element can provide more efficient heat dissipation, with the result that the thermal conduction element can, if desired, be made smaller than would otherwise be the case.

One or more luminescent elements (i.e., lumiphors), when provided, can be in any desired form. For example, in one aspect, a lighting device according to the present invention can comprise at least one luminescent element which comprises a first luminescent material, the luminescent element being attached to the lighting device such that the luminescent element and the thermal conduction element and/or the reflective element define an internal space, at least one of the solid state light emitters being positioned within the internal space.

In some embodiments according to the present invention, the lighting device comprises at least one luminescent element which comprises at least a first luminescent element region and a second luminescent element region, the first luminescent element region comprising a first luminescent material, the second luminescent element region comprising a second luminescent material, the first luminescent material, upon being excited, emitting light of a first wavelength (or range of wavelengths), the second luminescent material, upon being excited, emitting light of a second wavelength (or range of wavelengths), the second wavelength (or range of wavelengths) differing from the first wavelength (or range of wavelengths).

Alternatively or additionally, one or more luminescent element can be provided on or as part of at least a portion of one of more of the reflective element(s).

Likewise, one or more colored surface and/or color filter can be provided in any location as described herein with respect to luminescent elements.

Such luminescent elements, colored surfaces and/or color filters can be employed to provide mixing of light in any desired way, such as for mixing (1) a mixture of light having x, y color coordinates which define a point which is within an area on a 1931 CIE Chromaticity Diagram enclosed by first, second, third, fourth and fifth line segments, said first line segment connecting a first point to a second point, said second line segment connecting said second point to a third point, said third line segment connecting said third point to a fourth point, said fourth line segment connecting said fourth point to a fifth point, and said fifth line segment connecting said fifth point to said first point, said first point having x, y coordinates of 0.32, 0.40, said second point having x, y coordinates of 0.36, 0.48, said third point having x, y coordinates of 0.43, 0.45, said fourth point having x, y coordinates of 0.42, 0.42, and said fifth point having x, y coordinates of 0.36, 0.38 with (2) light having a dominant wavelength in the range of from 600 nm to 630 nm (as described in U.S. Patent Application No. 60/793,524, filed on Apr. 20, 2006, U.S. Patent Application No. 60/793,518, filed on Apr. 20, 2006, U.S. Patent Application No. 60/793,530, filed on Apr. 20, 2006, U.S. Patent Application No. 60/857,305, filed on Nov. 7, 2006, U.S. Patent Application No. 11/566,440, filed on Dec. 4, 2006 and U.S. Patent Application No. 60/868,986, filed on Dec. 7, 2006), or providing a mixture of red, green and blue light (to provide light which is perceived as white light) from luminescent elements excited by LEDs which emit ultraviolet light.

Representative examples of suitable filters for use in the present invention include those described in U.S. Patent Application No. 60/891,148, filed on Feb. 22, 2007, entitled "LIGHTING DEVICE AND METHODS OF LIGHTING, LIGHT FILTERS AND METHODS OF FILTERING LIGHT" (inventor: Antony Paul van de Ven, the entirety of which is hereby incorporated by reference.

In general, light of any number of colors can be mixed by the lighting devices according to the present invention. Representative examples of blends of light colors are described in:

(1) U.S. Patent Application No. 60/752,555, filed Dec. 21, 2005, entitled "Lighting Device and Lighting Method" (inventors: Antony Paul Van de Ven and Gerald H. Negley), the entirety of which is hereby incorporated by reference;

(2) U.S. Patent Application No. 60/752,556, filed on Dec. 21, 2005, entitled "SIGN AND METHOD FOR LIGHTING" (inventors: Gerald H. Negley and Antony Paul van de Ven), the entirety of which is hereby incorporated by reference;

(3) U.S. Patent Application No. 60/793,524, filed on Apr. 20, 2006, entitled "LIGHTING DEVICE AND LIGHTING METHOD" (inventors: Gerald H. Negley and Antony Paul van de Ven), the entirety of which is hereby incorporated by reference;

(4) U.S. Patent Application No. 60/793,518, filed on Apr. 20, 2006, entitled "LIGHTING DEVICE AND LIGHTING METHOD" (inventors: Gerald H. Negley and Antony Paul van de Ven), the entirety of which is hereby incorporated by reference;

(5) U.S. Patent Application No. 60/793,530, filed on Apr. 20, 2006, entitled "LIGHTING DEVICE AND LIGHTING METHOD" (inventors: Gerald H. Negley and Antony Paul van de Ven), the entirety of which is hereby incorporated by reference;

(6) U.S. patent application Ser. No. 11/566,440, filed on Dec. 4, 2006, entitled "LIGHTING DEVICE AND LIGHTING METHOD" (inventors: Antony Paul van de Ven and Gerald H. Negley), the entirety of which is hereby incorporated by reference;

(7) U.S. Patent Application No. 60/868,986, filed on Dec. 7, 2006, entitled "LIGHTING DEVICE AND LIGHTING METHOD" (inventors: Antony Paul van de Ven and Gerald H. Negley), the entirety of which is hereby incorporated by reference.

The solid state light emitters in the lighting devices of the present invention can be arranged in any desired pattern, mounted in any desired way, and supplied with electricity in any desired manner. Skilled artisans are familiar with a wide variety of arrangements, mounting schemes, and power supplying apparatuses, and any such arrangements, schemes, and apparatuses can be employed in connection with the present invention. The lighting devices of the present invention can be electrically connected (or selectively connected) to any desired power source, persons of skill in the art being familiar with a variety of such power sources.

For example, multiple die can be arranged in many ways including a square grid or as a series of concentric rings. These arrangements increase the effective size (area) of the illumination source.

Representative examples of arrangements of sources of visible light, mounting structures, schemes for mounting sources of visible light, apparatus for supplying electricity to sources of visible light, housings for sources of visible light, fixtures for sources of visible light, power supplies for sources of visible light and complete lighting assemblies, all of which are suitable for the lighting devices of the present invention, are described in:

(1) U.S. Patent Application No. 60/752,753, filed on Dec. 21, 2005, entitled "Lighting Device" (inventors: Gerald H. Negley, Antony Paul van de Ven and Neal Hunter), the entirety of which is hereby incorporated by reference;

(2) U.S. Patent Application No. 60/798,446, filed on May 5, 2006, entitled "Lighting Device" (inventor: Antony Paul van de Ven), the entirety of which is hereby incorporated by reference;

(3) U.S. Patent Application No. 60/845,429, filed on Sep. 18, 2006, entitled "LIGHTING DEVICES, LIGHTING ASSEMBLIES, FIXTURES AND METHODS OF USING SAME" (inventor: Antony Paul van de Ven), the entirety of which is hereby incorporated by reference;

(4) U.S. Patent Application No. 60/846,222, filed on Sep. 21, 2006, entitled "LIGHTING ASSEMBLIES, METHODS OF INSTALLING SAME, AND METHODS OF REPLACING LIGHTS" (inventors: Antony Paul van de Ven and Gerald H. Negley), the entirety of which is hereby incorporated by reference;

(5) U.S. Patent Application No. 60/809,618, filed on May 31, 2006, entitled "LIGHTING DEVICE AND METHOD OF LIGHTING" (inventors: Gerald H. Negley, Antony Paul van de Ven and Thomas G. Coleman), the entirety of which is hereby incorporated by reference; and (6) U.S. Patent Application No. 60/858,558, filed on Nov. 13, 2006, entitled "LIGHTING DEVICE, ILLUMINATED ENCLOSURE AND LIGHTING METHODS" (inventor: Gerald H. Negley), the entirety of which is hereby incorporated by reference.

In addition, any desired circuitry can be employed in order to supply energy to the lighting devices according to the present invention. Representative examples of circuitry which may be used in practicing the present invention is described in:

(1) U.S. Patent Application No. 60/809,959, filed on Jun. 1, 2006, entitled "Lighting Device With Cooling" (inventors: Thomas G. Coleman, Gerald H. Negley and Antony Paul van de Ven), the entirety of which is hereby incorporated by reference;

(2) U.S. Patent Application No. 60/809,595, filed on May 31, 2006, entitled "LIGHTING DEVICE AND METHOD OF LIGHTING" (inventor: Gerald H. Negley), the entirety of which is hereby incorporated by reference; and (3) U.S. Patent Application No. 60/844,325, filed on Sep. 13, 2006, entitled "BOOST/FLYBACK POWER SUPPLY TOPOLOGY WITH LOW SIDE MOSFET CURRENT CONTROL" (inventor: Peter Jay Myers), the entirety of which is hereby incorporated by reference.

In some embodiments of the present invention, power is supplied to the solid state light emitters via conductive tracks. Such conductive tracks can be any suitable structure which conducts electricity. Persons of skill in the art are familiar with, and can readily provide, a wide variety of conductive tracks provided in a wide variety of forms. For example, conductive tracks can be metallized traces formed on, painted on or printed on the thermal conduction element (and/or additional component(s) of the lighting device), or can be wires or lead frames placed along a surface or surfaces of the thermal conduction element.

The expression "conductive track", as used herein, refers to a structure which comprises a conductive portion, and may further include any other structure, e.g., one or more insulating layers. For example, a conductive track mounted on a housing might consist of an insulating layer and a conductive layer, particularly where the housing is capable of conducting electricity (in which case the conductive track is mounted on the housing with the insulating layer of the conductive track in contact with the housing and the conductive layer of the conductive track not in contact with the housing), and one or more light emitting diode chips are electrically connected to the conductive layers of the conductive tracks such that the light emitting diode chips can be powered by electricity and illuminated.

The expression "on", e.g., as used in the preceding paragraph in the expression "painted on", "printed on", or as used anywhere else in the present specification, e.g., "mounted on", means that the first structure which is "on" a second structure can be in contact with the second structure, or can be separated from the second structure by one or more intervening structures.

In one aspect of the invention, the conductive tracks (and therefore the solid state light emitters as well) are coupleable, i.e., can be electrically connected (permanently or selectively), to one or more power supply, e.g., to one or more batteries and/or to electrical service. For example, circuitry can be provided in which (1) electricity is normally supplied to the lighting device through electrical service (e.g., connected to the grid) under normal conditions, and in which (2) if electrical service is interrupted (e.g., in the case of a power outage), one or more switches can be closed whereby power can be supplied to some (e.g., at least about 5 percent or at least about 20 percent) or all of the solid state light emitters. Where necessary, there is preferably further provided a device which detects when electrical service has been interrupted, and automatically switches on battery power to at least some of the solid state light emitters.

Persons of skill in the art are familiar with various ways of electrically connecting (permanently or selectively) conductive tracks to power supplies, and any such ways can be employed in accordance with the present invention.

A statement herein that two components in a device are "electrically connected," means that there are no components electrically between the components, the insertion of which materially affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board or another medium, are electrically connected.

In some embodiments of the present invention, the solid state light emitters can optionally be connected (permanently or selectively) to one or more photovoltaic energy collection device (i.e., a device which includes one or more photovoltaic cells which converts solar energy sun into electrical energy), such that energy can be supplied from the photovoltaic energy collection device to the solid state light emitters.

One or more brightness enhancement films can optionally further be included in the lighting devices according to the present invention. Such films are well-known in the art and are readily available. Brightness enhancement films (e.g., BEF films commercially available from 3M) are optional—when employed, they provide a more directional light source by limiting the acceptance angle. Light not "accepted" is recycled by the highly reflective light source enclosure. Preferably, the brightness enhancement films (which can optionally be replaced by one or more extraction films, such as by WFT), if employed, are optimized to limit the viewing angle of the emitted source and to increase the probability of extracting light on the first (or earliest possible) pass.

In addition, one or more scattering layers can optionally be included in the lighting devices according to the present invention. The scattering layer(s) can be included in a luminophor layer, and/or a separate scattering layer can be provided. A wide variety of separate scattering layers and combined luminescent and scattering layers are well known to those of skill in the art, and any such layers can be employed in the lighting devices of the present invention.

The devices according to the present invention can further comprise one or more long-life cooling device (e.g., a fan with an extremely high lifetime). Such long-life cooling device(s) can comprise piezoelectric or magnetorestrictive materials (e.g., MR, GMR, and/or HMR materials) that move air as a "Chinese fan". In cooling the devices according to the present invention, typically only enough air to break the boundary layer is required to induce temperature drops of 10 to 15 degrees C. Hence, in such cases, strong "breezes" or a large fluid flow rate (large CFM) are typically not required (thereby avoiding the need for conventional fans).

The devices according to the present invention can further comprise secondary optics to farther change the projected nature of the emitted light. Such secondary optics are well-known to those skilled in the art, and so they do not need to be described in detail herein—any such secondary optics can, if desired, be employed.

The devices according to the present invention can further comprise sensors or charging devices or cameras, etc. For example, persons of skill in the art are familiar with, and have ready access to, devices which detect one or more occurrence (e.g., motion detectors, which detect motion of an object or person), and which, in response to such detection, trigger illumination of a light, activation of a security camera, etc. As a representative example, a device according to the present invention can include a lighting device according to the present invention and a motion sensor, and can be constructed such that (1) while the light is illuminated, if the motion sensor detects movement, a security camera is activated to record visual data at or around the location of the detected motion, or (2) if the motion sensor detects movement, the light is illuminated to light the region near the location of the detected motion and the security camera is activated to record visual data at or around the location of the detected motion, etc.

FIG. 2 is a sectional view of a representative embodiment of a lighting device 10 according to the present invention— the lighting device depicted in FIG. 2 is shown having been attached to a construction surface (in this case, a ceiling 14). The lighting device 10 depicted in FIG. 2 comprises a thermal conduction element 11, a plurality of solid state light emitters 12 (in this embodiment, the solid state light emitters 12 are LEDs 12), and a reflective element 13. The lighting device 10 has been attached to a contact region of a ceiling 14 adjacent to a substantially circular construction surface opening 15 which has been cut in the ceiling 14.

The thermal conduction element 11 has a first side 16 and a second side 17. A first portion of the first side 16 of the thermal conduction element 11 is in contact with the ceiling 14; the LEDs 12 are thermally attached to a second portion of the first side 16 of the thermal conduction element 11; and the reflective element 13 is mounted on a third portion of the first side 16 of the thermal conduction element 11. The reflective element 13 extends into the construction surface opening 15. As can be seen from FIG. 2, the first portion and the second portion of the first side 16 of the thermal conduction element 11 are concentric, with the first portion being radially outside the second portion.

The thermal conduction element 11 defines a conduction element opening 18. The thermal conduction element 11 is substantially toroidal, and is annular.

The conduction element opening 18 is covered by a light transmitting plate 19, so that light which is emitted by any of the LEDs 12 and which passes through the conduction element opening 18 must pass through the light transmitting plate 19. The LEDs 12 are generally pointing up and not into the opening 18. The reflective element 13 mixes and/or reflects the light emitted by the LEDs downward and through the opening 18.

As shown in FIG. 2, the first side 16 of the thermal conduction element 11 surrounds the conduction element opening 18.

As also shown in FIG. 2, the first side 16 of the thermal conduction element 11 is a first surface and the second side 17 of the thermal conduction element 11 is a second surface, and the first surface and the second surface are substantially parallel to each other and are spaced from each other by a distance which not greater than 10% of the maximum distance between any two points on the second surface (i.e., in this case, the diameter of the thermal conduction element 11).

As also shown in FIG. 2, the second side of the thermal conduction element is exposed to ambient air. Heat generated by the LEDs 12 is conducted through the body of the thermal conduction element 11 and dissipated on the textured surface on the second side of the thermal conduction element 11 into the ambient environment of the room.

Figure 3:
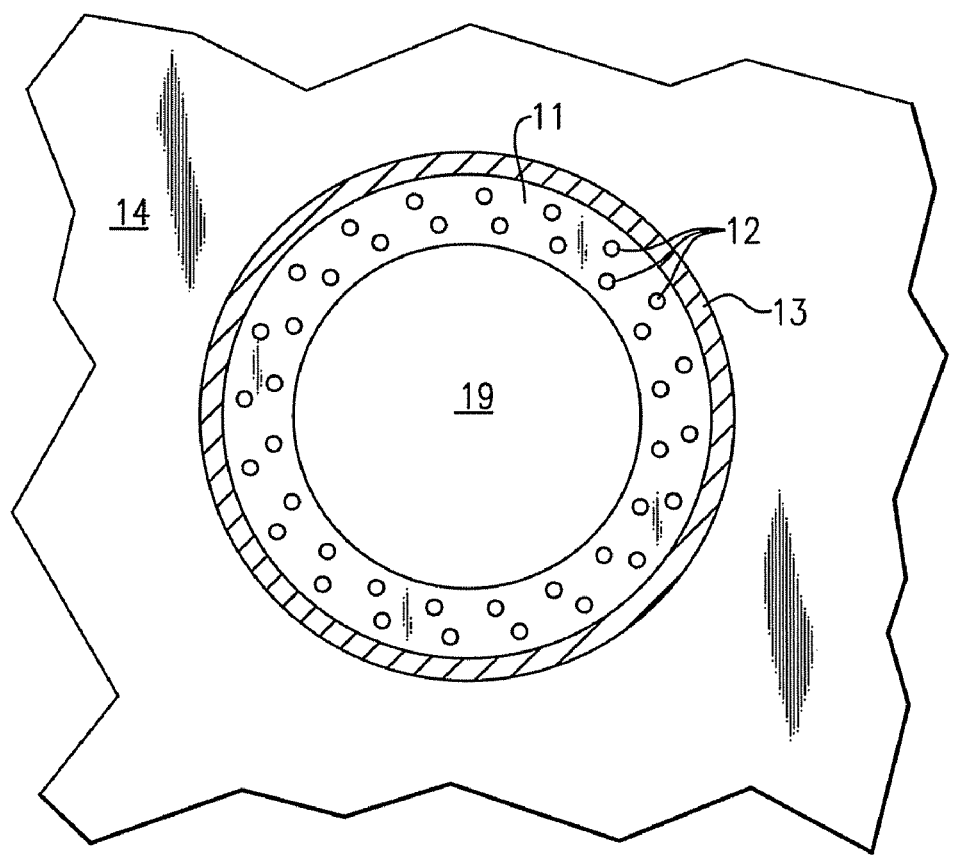
FIG. 3 is a view along a plane III-III shown in FIG. 2.

FIG. 3 is a view along a plane III-III shown in FIG. 2.

FIG. 4 is a bottom perspective view of an embodiment of a lighting device similar to the one shown in FIGS. 2 and 3, except that the lighting device depicted in FIG. 4 does not have a light transmitting plate 19, and the lighting device depicted in FIG. 4 has lenses or reflectors 20 which collimate the light of the LEDs 12 prior to the reflection of the light by the reflective surface 13.

Figure 5:
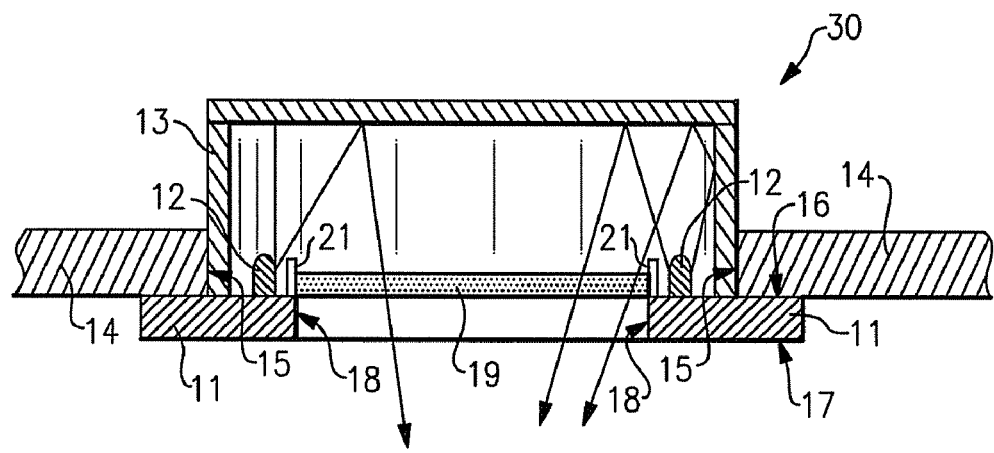
FIG. 5 is a sectional view of another embodiment of a lighting device according to the present invention.

FIG. 5 is a sectional view of another embodiment of a lighting device 30 according to the present invention. The lighting device 30 is similar to the lighting device 10 depicted in FIG. 2, except that the lighting device 30 further comprises a shield member 21 which extends from the first side 16 of the thermal conduction element 11 away from the second side 17 of the thermal conduction element 11.

Figure 6:
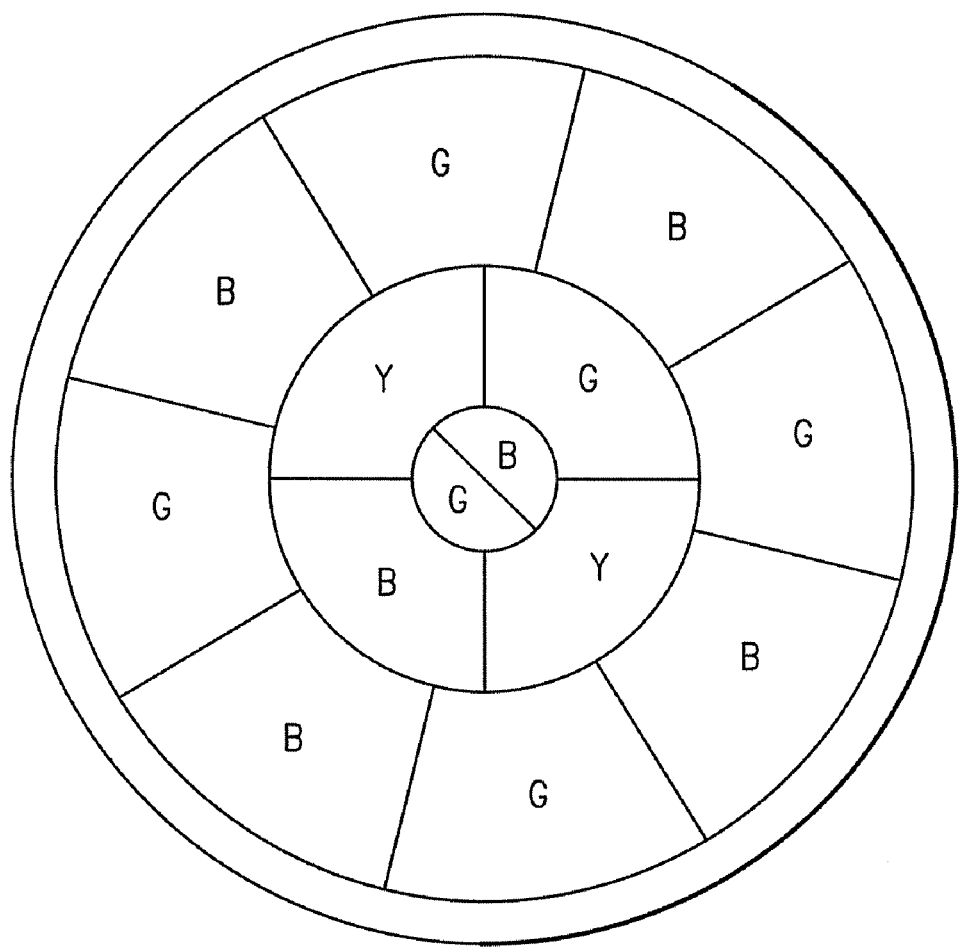
FIG. 6 is a perspective view of a luminescent element which can be employed in lighting devices according to the present invention.

FIG. 6 is a perspective view of a luminescent element which has a plurality of regions, each of the regions having a luminescent material selected from among luminescent material which, when illuminated by the solid state light emitters, emit blue light, green light or yellow light. The regions depicted in FIG. 6 are marked to indicate the type of luminescent material in each region, where a "B" marked in the region indicates that the region contains luminescent material which, when illuminated by the solid state light emitters, will emit blue light, where a "G" marked in the region indicates that the region contains luminescent material which, when illuminated by the solid state light emitters, will emit green light, and where a "Y" marked in the region indicates that the region contains luminescent material which, when illuminated by the solid state light emitters, will emit yellow light.

Figure 7:
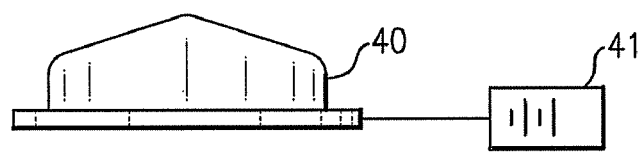
FIG. 7 is a schematic illustration showing a lighting device according to the present invention electrically connected to a power supply.

FIG. 7 is a schematic illustration showing a lighting device 40 according to the present invention electrically connected to a power supply 41.

Figure 8:
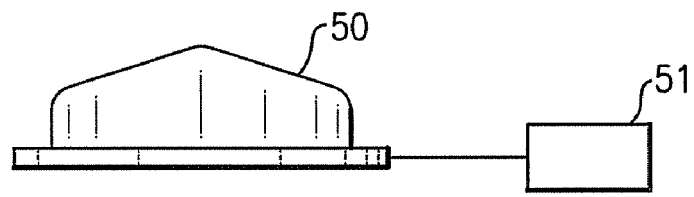
FIG. 8 is a schematic illustration showing a lighting device according to the present invention electrically connected to a photovoltaic energy collection device.

FIG. 8 is a schematic illustration showing a lighting device 50 according to the present invention electrically connected to a photovoltaic energy collection device 51.

FIG. 9 is a sectional view of a representative embodiment of a lighting device 60 according to the present invention— the lighting device depicted in FIG. 9 is shown having been attached to a construction surface (in this case, a ceiling 61). The lighting device 60 depicted in FIG. 9 comprises a thermal conduction element 62, a plurality of solid state light emitters 63 (in this embodiment, the solid state light emitters 63 are LEDs 63), and a reflective element 64.

The thermal conduction element 62 defines a conduction element opening 65. The thermal conduction element 62 surrounds the conduction element opening 65. The thermal conduction element 62 includes a region 66 which is reflective, thus providing an addition reflective element.

As shown in FIG. 9, a portion of the thermal conduction element 62 is exposed to ambient air in the room. Heat generated by the LEDs 63 is conducted through the body of the thermal conduction element 62 and dissipated from the thermal conduction element 62 into the ambient environment of the room.

Figure 10:
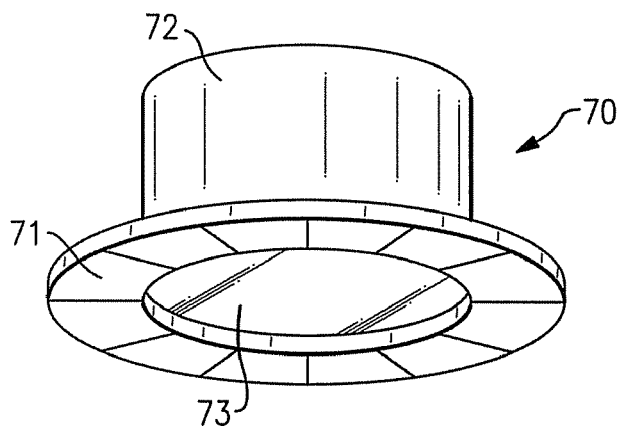
FIG. 10 is a perspective view of another representative embodiment of a lighting device according to the present invention.

FIG. 10 is a perspective view of another representative embodiment of a lighting device 70 according to the present invention. The lighting device 70 depicted in FIG. 10 comprises an annular thermal conduction element 71, a plurality of solid state light emitters (not visible in FIG. 10), and a reflective element 72 (i.e., an element which is reflective on its inside surface).

The thermal conduction element 71 defines a conduction element opening 73 and surrounds the conduction element opening 73.

The thermal conduction element 71 is exposed to ambient air in the room.

Figure 11:
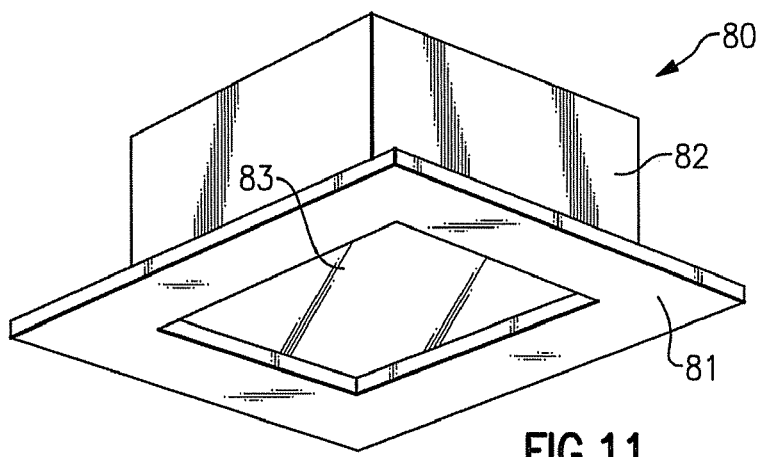
FIG. 11 is a perspective view of another representative embodiment of a lighting device according to the present invention.

FIG. 11 is a perspective view of another representative embodiment of a lighting device 80 according to the present invention. The lighting device 80 depicted in FIG. 11 comprises a thermal conduction element 81, a plurality of solid state light emitters (not visible in FIG. 11), and a reflective element 82 (i.e., an element which is reflective on its inside surface).

The thermal conduction element 81 defines a conduction element opening 83 and surrounds the conduction element opening 83.

The thermal conduction element 81 is exposed to ambient air in the room.

Figure 12:
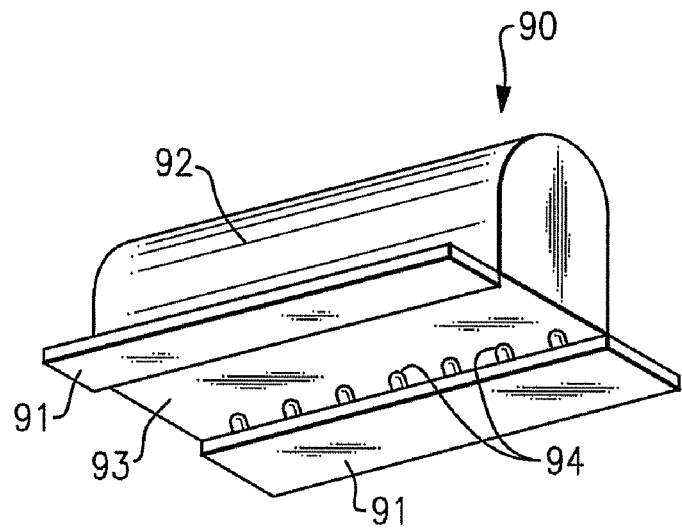
FIG. 12 is a perspective view of another representative embodiment of a lighting device according to the present invention.

FIG. 12 is a perspective view of another representative embodiment of a lighting device 90 according to the present invention. The lighting device 90 depicted in FIG. 12 comprises a pair of thermal conduction elements 91, a plurality of solid state light emitters 94, and a reflective element 92 (i.e., an element which is reflective on its inside surface).

The thermal conduction element 91 defines a conduction element opening 93 but it does not surround the conduction element opening 93.

The thermal conduction element 91 is exposed to ambient air in the room.

Figure 13:
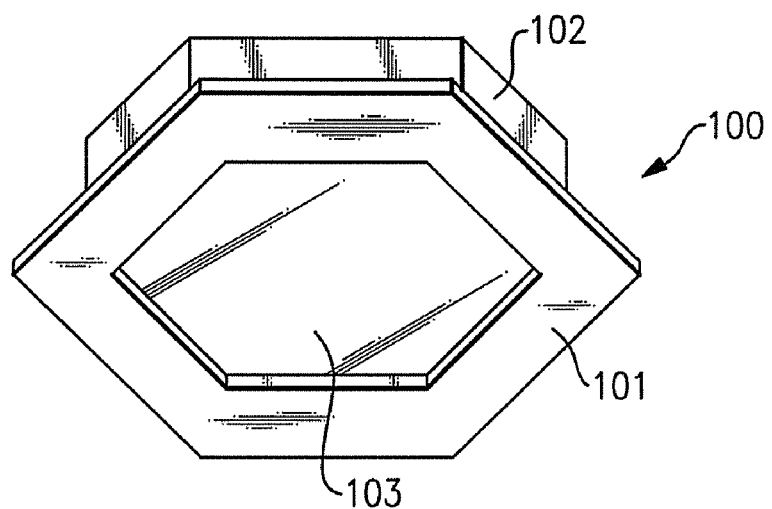
FIG. 13 is a perspective view of another representative embodiment of a lighting device according to the present invention.

FIG. 13 is a perspective view of another representative embodiment of a lighting device 100 according to the present invention. The lighting device 100 depicted in FIG. 13 comprises a thermal conduction element 101, a plurality of solid state light emitters (not visible in FIG. 13), and a reflective element 102 (i.e., an element which is reflective on its inside surface).

The thermal conduction element 101 defines a conduction element opening 103 and surrounds the conduction element opening 103.

The thermal conduction element 101 is exposed to ambient air in the room.

Figure 16:
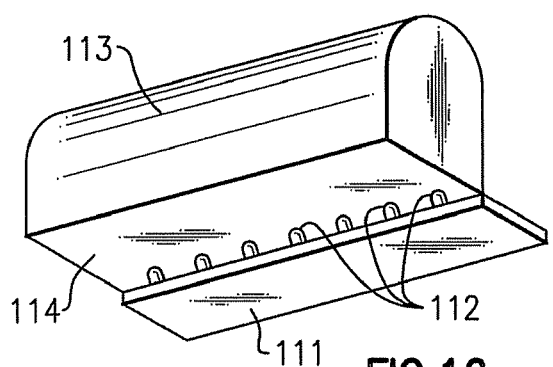
FIG. 16 is a perspective view of another representative embodiment of a lighting device according to the present invention.

In addition, the present invention is directed to lighting devices which would be obtained by designs created by cutting in half (or in any other ratio) any of the profiles described herein (e.g., any of the profiles depicted in any of FIG. 2, 5 or 9-13), with the solid state light emitters being on only one side, to create a "one-sided" fixture. Such "one-sided" fixtures would include substantially linear fixtures which could extend for a relatively long length. For example, in FIG. 16, there is depicted a fixture which would be obtained from a design in which the design of FIG. 12 is cut. Referring to FIG. 16, there is shown a lighting device 110 which comprises a thermal conduction element 111, a plurality of solid state light emitters 112, and a reflective element 113 (i.e., an element which is reflective on its inside surface). The thermal conduction element 111 defines a conduction element opening 114 but it does not surround the conduction element opening 114.

In addition, the present invention is directed to lighting devices which would be obtained by designs created by rotating any of the profiles described herein (e.g., the profiles depicted in any of FIG. 2, 5 or 9) to create a toroidal fixture, or by extruding to create regular shapes such as squares, rectangles, extended rectangles or irregular shapes (with or without end sections).

Figure 14:
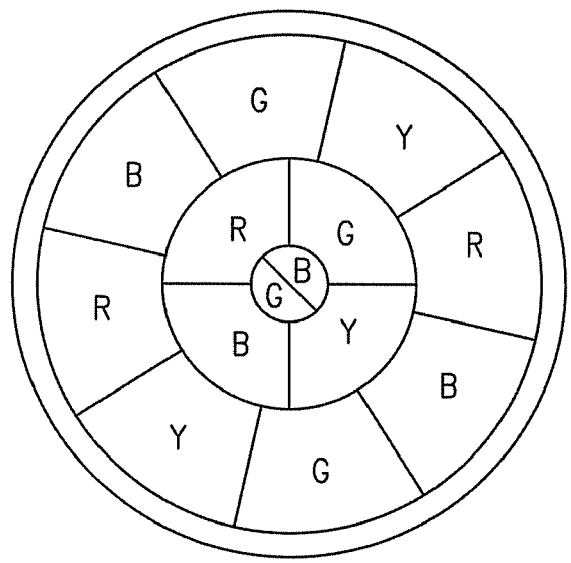
FIG. 14 is a perspective view of a second embodiment of a luminescent element which can be employed in lighting devices according to the present invention.

FIG. 14 is a perspective view of a second embodiment of a luminescent element which has a plurality of regions, each of the regions having a luminescent material selected from among luminescent material which, when illuminated by the solid state light emitters, emit blue light, green light, yellow light or red light. The regions depicted in FIG. 14 are marked to indicate the type of luminescent material in each region, where a "B" marked in the region indicates that the region contains luminescent material which, when illuminated by the solid state light emitters, will emit blue light, where a "G" marked in the region indicates that the region contains luminescent material which, when illuminated by the solid state light emitters, will emit green light, where a "Y" marked in the region indicates that the region contains luminescent material which, when illuminated by the solid state light emitters, will emit yellow light, and where a "R" marked in the region indicates that the region contains luminescent material which, when illuminated by the solid state light emitters, will emit red light.

Figure 15:
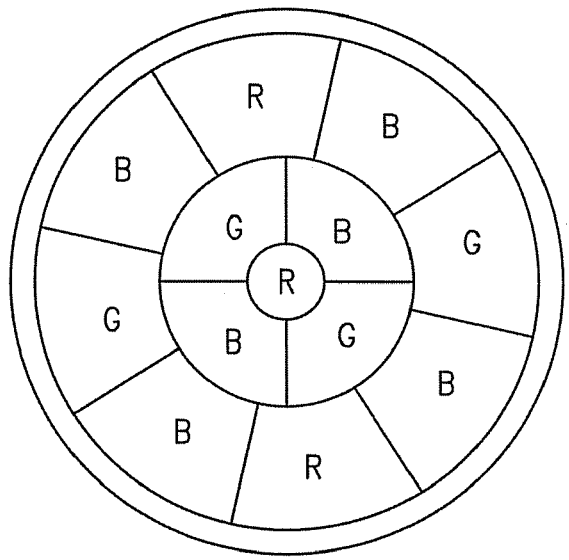
FIG. 15 is a perspective view of a third embodiment of a luminescent element which can be employed in lighting devices according to the present invention.

FIG. 15 is a perspective view of another embodiment of a luminescent element which has a plurality of regions, each of the regions having a luminescent material selected from among luminescent material which, when illuminated by the solid state light emitters, emit blue light, green light or red light. The regions depicted in FIG. 15 are marked to indicate the type of luminescent material in each region, where a "B" marked in the region indicates that the region contains luminescent material which, when illuminated by the solid state light emitters, will emit blue light, where a "G" marked in the region indicates that the region contains luminescent material which, when illuminated by the solid state light emitters, will emit green light, and where a "R" marked in the region indicates that the region contains luminescent material which, when illuminated by the solid state light emitters, will emit red light.

Any two or more structural parts of the lighting devices described herein can be integrated. Any structural part of the lighting devices described herein can be provided in two or more parts which are held together, if necessary.

The invention claimed is:

1. A lighting device, comprising:
   at least one thermal conduction element;
   a plurality of solid state light emitters; and
   at least a first reflective element,
   wherein said solid state light emitters are mounted on at least a first portion of said thermal conduction element and said first reflective element is positioned such that at least a portion of light emitted from at least one of said solid state light emitters is reflected by said first reflective element, and
   wherein a second portion of said thermal conduction element is exposed to ambient air.

2. A lighting device as recited in claim 1, wherein at least a first of said solid state light emitters is a light emitting diode.

3. A lighting device as recited in claim 1, wherein said thermal conduction element defines at least one conduction element opening.

4. A lighting device as recited in claim 3, wherein said conduction element opening is covered by a light transmitting plate, so that light which is emitted by any of said solid state light emitters and which passes through said conduction element opening must pass through said light transmitting plate.

5. A lighting device as recited in claim 3, wherein said thermal conduction element surrounds said conduction element opening.

6. A lighting device as recited in claim 1, wherein said reflective element is mounted on a second portion of said thermal conduction element.

7. A lighting device as recited in claim 1, wherein a second reflective element is positioned on said thermal conduction element.

8. A lighting device as recited in claim 1, wherein a fourth portion of said thermal conduction element is in contact with a contact region of a construction surface, said construction surface having at least one construction surface opening, said contact region surrounding said construction surface opening.

9. A lighting device as recited in claim 1, further comprising at least one battery and circuitry selectively connecting said battery electrically to at least one of said solid state light emitters.

10. A lighting device, comprising:
at least one thermal conduction element, said thermal conduction element having a first side and a second side, said first side of said thermal conduction element comprising at least a first surface, said thermal conduction element defining at least one conduction element opening;
a plurality of solid state light emitters mounted on said first side of said thermal conduction element;
at least one reflective element, said reflective element also being mounted on said first side of said thermal conduction element; and
at least one shield member, said shield member extending from said first side of said thermal conduction element away from said second side of said thermal conduction element.

11. A lighting device as recited in claim 10, wherein said thermal conduction element is substantially toroidal.

12. A lighting device as recited in claim 11, wherein said thermal conduction element is annular.

13. A lighting device as recited in claim 10, wherein said conduction element opening is covered by a light transmitting plate, so that light which is emitted by any of said solid state light emitters and which passes through said conduction element opening must pass through said light transmitting plate.

14. A lighting device as recited in claim 10, wherein at least one of said solid state light emitters is an LED.

15. A lighting device as recited in claim 10, wherein said thermal conduction element surrounds said conduction element opening.

16. A lighting device as recited in claim 10, wherein said first side is a first surface and said second side comprises a second surface, and said first surface and said second surface are substantially parallel to each other and are spaced from each other by a distance which is not greater than 10% of the maximum distance between any two points on said second surface.

17. A lighting device as recited in claim 16, wherein said thermal conduction element is substantially toroidal.

18. A lighting device as recited in claim 17, wherein said thermal conduction element is annular.

19. A lighting device as recited in claim 10, wherein said first surface comprises only a portion of said first side.

20. A lighting device as recited in claim 19, wherein said second surface comprises only a portion of said second side.

21. A lighting device as recited in claim 19, wherein said second surface comprises an entirety of said second side.

22. A lighting device as recited in claim 10, wherein said second surface comprises only a portion of said second side.

23. A lighting device as recited in claim 10, wherein said first surface comprises an entirety of said first side.

24. A lighting device as recited in claim 23, wherein said second surface comprises only a portion of said second side.

25. A lighting device as recited in claim 23, wherein said second surface comprises an entirety of said second side.

26. A lighting device as recited in claim 10, wherein said second surface comprises an entirety of said second side.

27. A lighting device, comprising:
at least one thermal conduction element, said thermal conduction element having a first side and a second side, said first side of said thermal conduction element comprising at least a first surface, a first portion of said first side being in contact with a contact region of a construction surface, said construction surface having at least one construction surface opening, said contact region surrounding said construction surface opening, said thermal conduction element defining at least one conduction element opening, said second side comprising a second surface, said first surface and said second surface being substantially parallel to each other and being spaced from each other by a distance which is not greater than 10% of the maximum distance between any two points on said second surface;
a plurality of solid state light emitters mounted on a second portion of said first side of said thermal conduction element; and
at least one reflective element, said reflective element being mounted on a third portion of said first side of said thermal conduction element, said reflective element extending into said construction surface opening.

28. A lighting device as recited in claim 27, wherein said thermal conduction element is substantially toroidal.

29. A lighting device as recited in claim 28, wherein said thermal conduction element is annular, said first portion of said first side and said second portion of said first side are substantially concentric, and said first portion of said first side is radially outside said second portion of said first side.

30. A lighting device as recited in claim 27, wherein said conduction element opening is covered by a light transmitting plate, so that light which is emitted by any of said solid state light emitters and which passes through said conduction element opening must pass through said light transmitting plate.

31. A lighting device as recited in claim 27, wherein at least one of said solid state light emitters is an LED.

32. A lighting device as recited in claim 27, wherein said first portion of said first side is in contact with said construction surface at least at locations adjacent to said construction surface opening.

33. A lighting device as recited in claim 27, wherein said construction surface is a ceiling, a wall or a floor.

34. A lighting device as recited in claim 27, wherein said second portion of said first side of said thermal conduction element surrounds said conduction element opening.

35. A lighting device as recited in claim 27, further comprising at least one shield member, said shield member extending from said first side of said thermal conduction element away from said second side of said thermal conduction element.

36. A lighting device as recited in claim 27, further comprising at least one photovoltaic energy collection device and circuitry connecting said photovoltaic energy collection device to at least one of said solid state light emitters.

37. A lighting device as recited in claim 36, wherein said circuitry connecting said photovoltaic energy collection device to said at least one of said solid state light emitters selectively electrically connects said photovoltaic energy collection device to said at least one of said solid state light emitters.

38. A lighting device as recited in claim 36, wherein said circuitry connecting said photovoltaic energy collection device to said at least one of said solid state light emitters directly electrically connects said photovoltaic energy collection device to said at least one of said solid state light emitters.

39. A lighting device as recited in claim 27, further comprising at least one battery and circuitry selectively connecting said battery electrically to at least one of said solid state light emitters.

40. A lighting device as recited in claim 39, wherein said circuitry selectively connects said battery electrically to at least about 5% of said solid state light emitters.

41. A lighting device as recited in claim 39, wherein said circuitry selectively connects said battery electrically to at least about 20% of said solid state light emitters.

42. A lighting device as recited in claim 39, wherein said circuitry selectively connects said battery electrically to all of said solid state light emitters.

43. A lighting device as recited in claim 39, wherein said circuitry automatically connects said battery electrically to at least one of said solid state light emitters during a power outage.

44. A lighting device, comprising:
at least one thermal conduction element, said thermal conduction element having a first side and a second side, said first side of said thermal conduction element comprising at least a first surface, a first portion of said first side being in contact with a contact region of a construction surface, said second side comprising a second surface, said first surface and said second surface are substantially parallel to each other and being spaced from each other by a distance which is not greater than 10% of the maximum distance between any two points on said second surface; and
a plurality of solid state light emitters, said solid state light emitters being mounted on a second portion of said first side of said thermal conduction element, said second side of said thermal conduction element being exposed to ambient air.

45. A lighting device as recited in claim 44, wherein said construction surface has at least one construction surface opening and said contact region surrounds said construction surface opening.

46. A lighting device as recited in claim 45, wherein said first portion of said first side is in contact with said construction surface at least at locations adjacent to said construction surface opening.

47. A lighting device as recited in claim 44, wherein said thermal conduction element defines at least one conduction element opening.

48. A lighting device as recited in claim 47, further comprising at least one reflective element, said reflective element being mounted on a third portion of said first side of said thermal conduction element, said reflective element extending into said construction surface opening.

49. A lighting device as recited in claim 48, wherein said conduction element opening is covered by a light transmitting plate, so that light which is emitted by any of said solid state light emitters and which passes through said conduction element opening must pass through said light transmitting plate.

50. A lighting device as recited in claim 47, wherein said second portion of said first side of said thermal conduction element surrounds said conduction element opening.

51. A lighting device as recited in claim 44, wherein said thermal conduction element is substantially toroidal.

52. A lighting device as recited in claim 51, wherein said thermal conduction element is annular, said first portion of said first side and said second portion of said first side are substantially concentric, and said first portion of said first side is radially outside said second portion of said first side.

53. A lighting device as recited in claim 44, wherein at least one of said solid state light emitters is an LED.

54. A lighting device as recited in claim 44, wherein said construction surface is a ceiling, a wall or a floor.

55. A lighting device as recited in claim 44, further comprising at least one shield member, said shield member extending from said first side of said thermal conduction element away from said second side of said thermal conduction element.

56. A lighting device, comprising:
at least one thermal conduction element;
a plurality of solid state light emitters;
at least first and second reflective elements, wherein:
said solid state light emitters are mounted on at least a first portion of said thermal conduction element and said first reflective element is positioned such that at least a portion of light emitted from at least one of said solid state light emitters is reflected by said first reflective element, and
said second reflective element is positioned on said thermal conduction element.

57. A lighting device, comprising:
at least one thermal conduction element;
a plurality of solid state light emitters; and
at least a first reflective element,
wherein:
said solid state light emitters are mounted on at least a first portion of said thermal conduction element and said first reflective element is positioned such that at least a portion of light emitted from at least one of said solid state light emitters is reflected by said first reflective element, and
a second portion of said thermal conduction element is in contact with a contact region of a construction surface, said construction surface having at least one construction surface opening, said contact region surrounding said construction surface opening.

58. A lighting device, comprising:
at least one thermal conduction element, said thermal conduction element having a first side and a second side, said first side of said thermal conduction element comprising at least a first surface, a first portion of said first side being in contact with a contact region of a construction surface, said construction surface having at least one construction surface opening, said contact region surrounding said construction surface opening, said thermal conduction element defining at least one conduction element opening;
a plurality of solid state light emitters mounted on a second portion of said first side of said thermal conduction element
at least one reflective element, said reflective element being mounted on a third portion of said first side of said thermal conduction element, said reflective element extending into said construction surface opening; and
at least one shield member, said shield member extending from said first side of said thermal conduction element away from said second side of said thermal conduction element.

59. A lighting device, comprising:
at least one thermal conduction element, said thermal conduction element having a first side and a second side, said first side of said thermal conduction element comprising at least one surface, a first portion of said first side being in contact with a contact region of a construction surface;
a plurality of solid state light emitters, said solid state light emitters being mounted on a second portion of said first side of said thermal conduction element, said second side of said thermal conduction element being exposed to ambient air; and
at least one shield member, said shield member extending from said first side of said thermal conduction element away from said second side of said thermal conduction element.

* * * * *